United States Patent [19]
Someya et al.

[11] Patent Number: 5,906,353
[45] Date of Patent: May 25, 1999

[54] TOGGLE VALVE

[75] Inventors: Hisao Someya, Saitama-ken; Takashi Ejiri, Tokyo, both of Japan

[73] Assignee: Fujikura Rubber Ltd., Tokyo, Japan

[21] Appl. No.: 08/889,408

[22] Filed: Jul. 8, 1997

[30] Foreign Application Priority Data

Oct. 3, 1996 [JP] Japan ................................. 8-263165

[51] Int. Cl.⁶ .................................................. F16K 31/163
[52] U.S. Cl. ................................ 251/58; 74/110; 74/516; 74/569; 92/130 A; 92/130 D; 92/140; 251/63.5; 251/63.6; 251/263; 251/331
[58] Field of Search ..................... 74/54, 110, 516, 74/519, 569; 92/130 A, 130 B, 138, 140; 251/58, 63.5, 63.6, 251, 263, 331

[56] References Cited

U.S. PATENT DOCUMENTS

| | | | |
|---|---|---|---|
| 2,395,223 | 2/1946 | Ingres | 74/516 |
| 4,270,398 | 6/1981 | Arnold | 74/110 |
| 4,549,719 | 10/1985 | Baumann | 251/58 |
| 4,609,178 | 9/1986 | Baumann | 251/229 |
| 4,684,103 | 8/1987 | Baumann | 251/58 |
| 4,791,856 | 12/1988 | Heim et al. | 251/63.6 |
| 4,871,143 | 10/1989 | Baker | 251/58 |
| 4,875,404 | 10/1989 | Aldridge | 92/130 A |
| 5,108,069 | 4/1992 | Tada et al. | 251/58 |
| 5,215,286 | 6/1993 | Kolenc | |
| 5,253,671 | 10/1993 | Kolenc | 251/58 |
| 5,516,075 | 5/1996 | Itoi et al. | 251/58 |
| 5,556,072 | 9/1996 | Itoi et al. | 251/58 |

FOREIGN PATENT DOCUMENTS

| | | | |
|---|---|---|---|
| 0 656 498 A1 | 6/1995 | European Pat. Off. | F16K 31/163 |
| 2 565 667 | 12/1985 | France | F23D 14/72 |

*Primary Examiner*—George L. Walton
*Attorney, Agent, or Firm*—McCormick, Paulding & Huber

[57] ABSTRACT

A toggle valve includes a valve stem which moves a valve body towards and away from a valve seat, an operation member separate from the valve stem, valve stem rollers which are supported by the valve stem and which have shafts whose axes extend in a direction perpendicular to the direction of the sliding movement of the valve stem without intersecting the same, a tapered surface provided on the end of the operation member adjacent to the valve stem, and intermediate rollers which are provided between the tapered surface of the operation member and the valve stem rollers to come into contact with the tapered surface and the valve stem rollers. The tapered surface, the intermediate rollers, and the valve stem rollers are arranged such that when the operation member is moved by a unit movement toward the valve stem to move the valve stem through the tapered surface, the intermediate rollers, and the valve stem rollers, the valve stem is moved by a displacement smaller than the unit displacement of the operation member.

8 Claims, 6 Drawing Sheets

TOGGLE VALVE

BACKGROUND OF THE INVENTION

1. Field of the Invention

The present invention relates to a toggle valve (high pressure valve) in which operational force is increased and transmitted to a valve stem which actuates a valve body.

2. Description of the Related Art

There are various known types of toggle valves. However, known toggle valves are large and elements thereof must be machined at extremely high precision. Moreover, it is difficult for known toggle valves to maintain stable operation for long periods of time.

SUMMARY OF THE INVENTION

It is an object of the present invention to provide a simple toggle valve which can operate stably for an extended period of time.

To achieve the object mentioned above, according to the present invention, there is provided a toggle valve comprising a valve stem which is slidably supported by a housing and which moves a valve body away from and toward a valve seat, an operation member separate from the valve stem, which is supported by the housing to slide in a direction parallel to the axis of the valve stem, a valve stem roller member which is supported by the valve stem and which has a shaft whose axis extends in a direction perpendicular to the direction of the sliding movement of the valve stem without intersecting the axis of the valve stem, a tapered surface provided on the end of the operation member adjacent to the valve stem, and an intermediate roller member which has a shaft extending parallel with the axis of the valve stem roller member and which is provided between the tapered surface of the operation member and the valve stem roller member to come into contact with the tapered surface and the valve stem roller member.

The above mentioned tapered surface, intermediate roller member and valve stem roller member are arranged such that when the operation member is moved by a unit displacement toward the valve stem in order to move the valve stem toward the valve seat through the tapered surface, the intermediate roller member, and the valve stem roller member, the valve stem is moved by a displacement smaller than that of the operation member.

The toggle valve further comprises a plurality of valve stem rollers and intermediate roller members, which are provided in a rotation symmetry with respect to the axis of the valve member.

The valve stem and the valve stem roller members comprise a valve stem assembly, and the valve stem is coaxial to the operation member.

The force to move the operation member toward the valve stem can be produced by a spring and the force to move the operation member away from the valve stem produced by fluid pressure, or the force to move the operation member toward the valve stem can be produced by fluid pressure, and the force to move the operation member away from the valve stem produced by a spring.

The tapered surface can be made of a conical surface or a wedge-like surface.

The present disclosure relates to subject matter contained in Japanese Patent Application No. 08-263165 (filed on Oct. 3, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
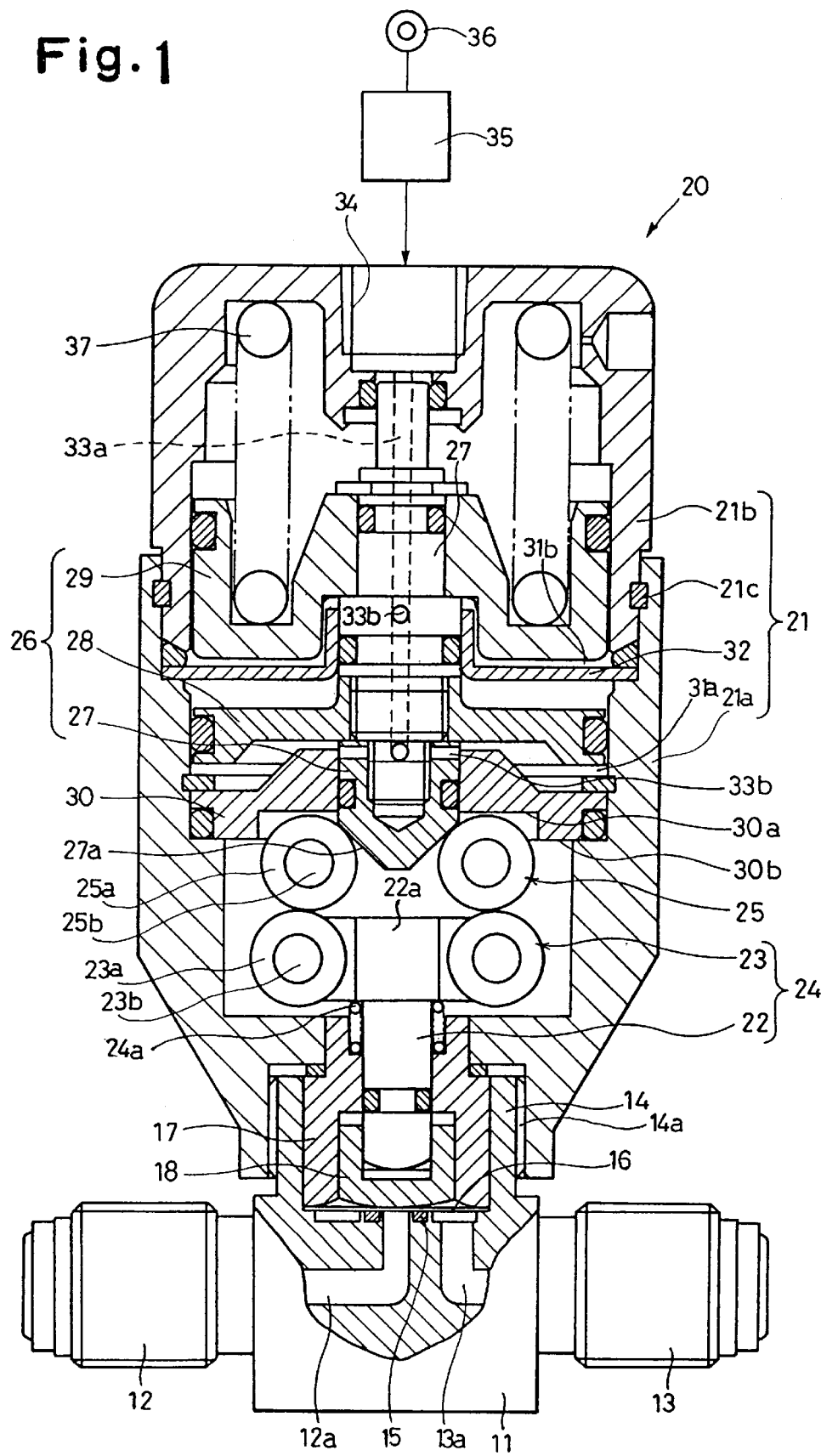
FIG. 1 is a longitudinal sectional view of a normally closed type toggle valve shown in a closed position, according to an aspect of the present invention.

In an embodiment illustrated in FIG. 1 which is applied to a normally closed type valve, a fluid passage block 11 is comprised of a pair of passage connectors 12 and 13 aligned along the same axis and a valve connector 14 which extends perpendicularly to the axis of the passage connectors 12 and 13. The passage connectors 12 and 13 are respectively provided therein with fluid passages 12a and 13a which open into the valve connector 14. An annular valve seat 15 is provided at the open end of fluid passage 12a.

The valve connector 14 is provided with a circular metal diaphragm 16 which covers the annular valve seat 15 and the open end of the fluid passage 13a, a retainer 17 which holds the metal diaphragm 16 at the peripheral edge thereof, and an opening and closing valve body 18 which is movably supported by the retainer 17.

In the illustrated embodiment, the fluid passage 12a is adapted to supply high-pressure fluid, and the annular valve seat 15 is located at the center of the metal diaphragm 16. The valve body 18 can be moved toward and away from the center portion of the metal diaphragm 16. When the valve body 18 is pressed against the annular valve seat 15 and thus against the high-pressure fluid in the fluid passage 12a, the fluid connection between the fluid passages 12a and 13a is broken by the metal diaphragm 16.

A lower housing 21a of a housing 21 of a toggle valve 20 is attached to the outer peripheral surface of the valve connector 14 by means of an external thread 14a formed on the outer peripheral surface of the valve connector 14. The housing 21 is comprised of the lower housing 21a and an upper housing 21b connected to the lower housing 21a by means of a lock ring 21c.

Figure 2:
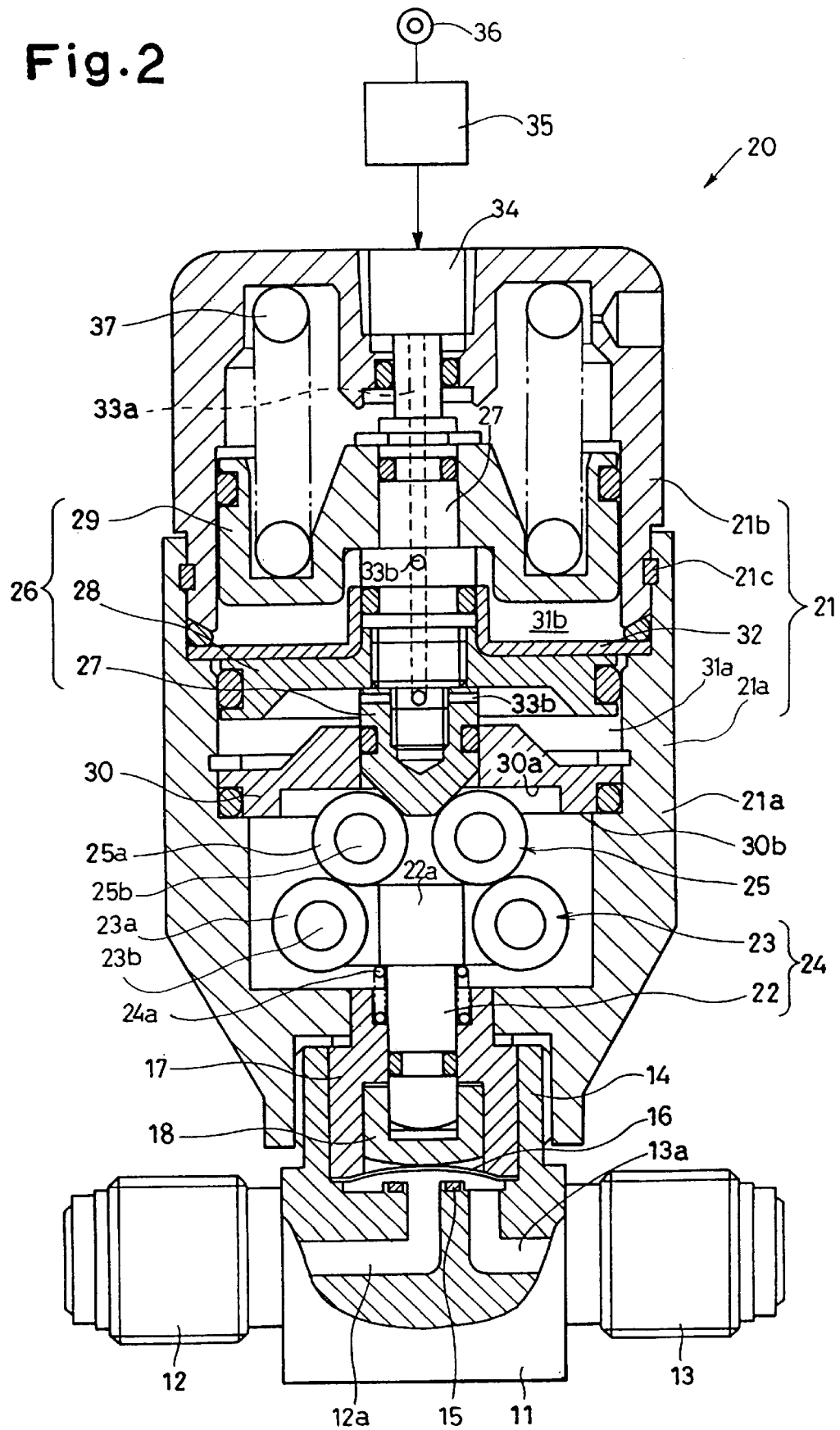
FIG. 2 is a longitudinal sectional view of a normally closed type toggle valve shown in an open position, according to an aspect of the present invention.

A valve stem assembly 24, a pair of intermediate rollers 25, and an operation member 26 are inserted and supported as movable components in the housing 21 in this order from the lower end thereof in FIGS. 1 and 2. The valve stem assembly 24 is comprised of a valve stem 22 which moves the valve body 18 away from and towards the annular valve seat 15 and a pair of valve stem roller members 23. The valve stem roller members 23 are each provided with a roller 23a which has a shaft 23b inserted in its center The shaft 23b is supported by a support plate 22a which is integral with and perpendicular to the valve stem 22. The valve stem roller members 23 (shafts 23b) are parallel to each other and are located in a rotation symmetry with respect to the axis of the valve stem 22. The axes of the valve stem roller members 23 (shafts 23b) extend perpendicular to the axis of the valve stem 22 without intersecting the same. The valve stem assembly 24 is biased by a compression spring 24a in the direction to move the valve stem 22 away from the metal diaphragm 16.

The operation member 26 is comprised of an operation shaft 27 coaxial to the valve stem 22, a piston member 28 integrally connected to an intermediate portion of the operation shaft 27, and a spring receiving piston member 29 integrally connected to the upper end of the operation shaft 27. The piston member 28 defines a valve opening pressure chamber 31a between the piston member 28 and a stationary separation wall 30 in the housing 21. The spring receiving piston chamber 29 defines another valve opening pressure chamber 31b between the piston member 29 and a stationary stop plate 32. The upper moving end of the piston member 28 in FIG. 1 is restricted by the stationary stop plate 32 in the housing 21 when the piston member 28 abuts against the stop plate 32. A pilot pressure P is exerted by a pilot pressure source 36 on the valve opening pressure chambers 31a and 31b through radial passage 33b and axial passage 33a, formed in the operation shaft 27, a pilot pressure introduction port 34 of the upper housing 21b and an opening and closing control valve 35.

Figure 3:
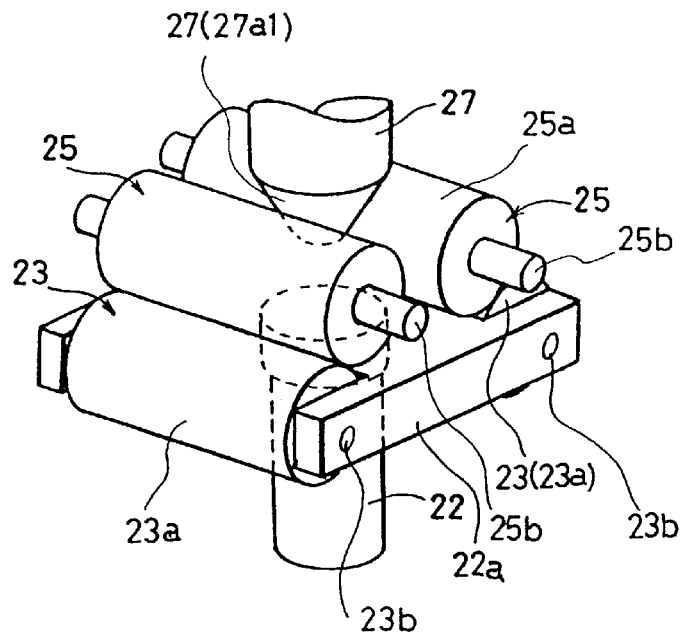
FIG. 3 is a perspective view of the toggle valve shown in FIGS. 1 and 2 to show a positional relationship of a tapered surface, intermediate roller members and valve stem roller members.
Figure 4:
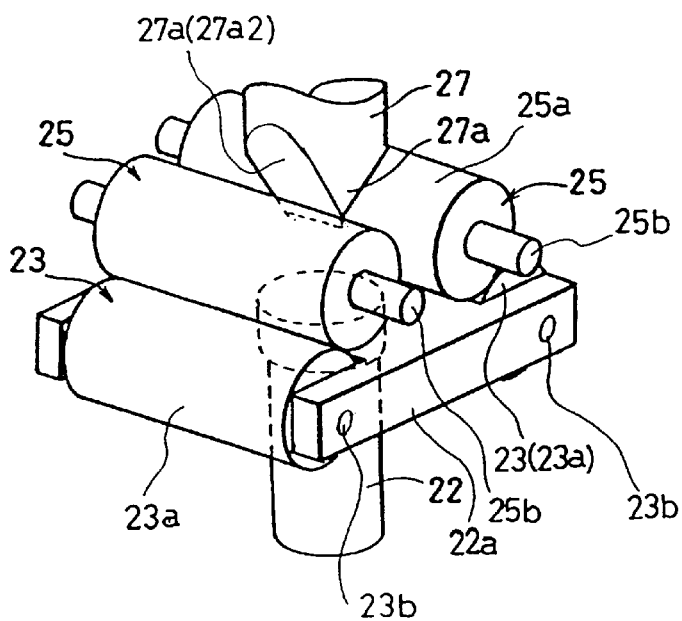
FIG. 4 is a perspective view of a toggle valve having a tapered surface different from that shown in FIG. 3; and, FIG. 5 is a longitudinal sectional view of a normally open type toggle valve shown in an open position, according to another aspect of the present invention.

A compression spring 37 is provided between the spring receiving piston member 29 and the upper housing 21b to continuously bias the operation member 26 toward the valve stem assembly 24. A tapered surface portion 27a is provided on the front end (lower end in FIG. 1) of the operation shaft 27 of the operation member 26. The pair of intermediate rollers 25 are provided between the tapered surface 27a and the valve stem roller members 23 of the valve stem assembly 24. The tapered surface 27a can be formed by a conical surface 27a as shown in FIG. 3, or a wedge-like surface consisting of a pair of oblique flat surfaces 27a2 as shown in FIG. 4. The compression spring 37 is sufficiently stronger than the compression spring 24a.

The intermediate rollers (idle roller members) 25 are each provided with a roller 25a which has a shaft 25b inserted in it. The rollers 25a are received in a recess 30a formed in the lower end of the stationary wall 30 so as to rotate but not to move in the axial direction. The shafts 25b are rotatably and slidably supported on a lower guide surface 30b of the stationary separation wall 30. The idle roller members 25 are parallel with the valve stem rollers 23 and are located between the tapered surface 27a of the operation shaft 27 and the valve stem roller members 23. The valve closing downward pressure acting on the operation member 26 is transmitted to the valve stem 22 through the tapered surface 27a, the intermediate rollers 25, the valve stem roller members 23 and the support plate 22a. The valve stem roller members 23 and the intermediate rollers 25 can be made of, for example, commercially available needle bearings which are inexpensive and have high precision.

The taper angle of the tapered surface 27a of the operation shaft 27 and the outer diameters and the initial positions of the intermediate rollers 25 and the valve stem roller members 23 (i.e. the positions when the valve body 18 is away from the annular valve seat 15) are determined as follows.

Namely, when the operation member 26 is moved toward the valve stem assembly 24 by a unit displacement, subsequently moving the valve stem 22 toward the annular valve seat 15 through the tapered surface 27a, the intermediate rollers 25 and the valve stem roller members 23, the valve stem 22 is moved by a displacement smaller than the unit displacement of the operation member 26.

In an embodiment, for instance, (the displacement of the operation member 26 in the axial direction):(the displacement of the valve stem 22 in the axial direction)=1:0.2 or 1:0.1. In any operational state, the intermediate rollers 25 are in contact with the tapered surface 27a and the valve stem roller members 23, and when the operation member 26 is moved to the lowermost position toward the valve stem assembly 24, the axis of the intermediate rollers 25 is never located outside of the axis of the valve stem roller members 23 in a radial direction of the valve stem 22.

The toggle valve constructed as above operates as follows.

When no pilot pressure is introduced in the valve opening pressure chambers 31a and 31b, the operation member 26 is moved toward the valve stem assembly 24 by the compression spring 37. The valve closing force caused by the movement of the operation member 26 is transmitted to the valve stem 22 through the tapered surface 27a of the operation shaft 27, the intermediate rollers 25 and the valve stem roller members 23, so that the valve stem 22 causes the valve body 18 to move toward the annular valve seat 15. Consequently, the fluid passage 12a is disconnected from the fluid passage 13a by the metal diaphragm 16 as shown in FIG. 1. In other words, the valve is normally closed.

Since the displacement of the valve stem 22 is smaller than the unit displacement of the operation member 26 when the valve closing force of the operation member 26 is transmitted to the valve stem 22 through the tapered surface 25, the intermediate rollers 25 and the valve stem roller members 23, it is possible to obtain a strong valve closing force by a small spring force from the compression spring 37. In the examples mentioned above, a valve closing force five or ten times the spring force of the compression spring 37 is obtained.

To open the valve, the opening and closing control valve 35 is opened to introduce the pilot pressure from the pilot pressure source 36 into the valve opening chambers 31a and 31b through the axial passage 33a and the radial passage 33b of the operation shaft 27. When the pilot pressure exceeds the spring force of the compression spring 37, the upward movement of the operation member 26 takes place, and subsequently the force to retain the valve body 18 in the closed position disappears. Hence, the deformation of the metal diaphragm 16 occurs due to the pressure within the fluid passage 12a, so that a fluid connection can be established between the fluid passages 12a and 13a (FIG. 2).

Figure 5:
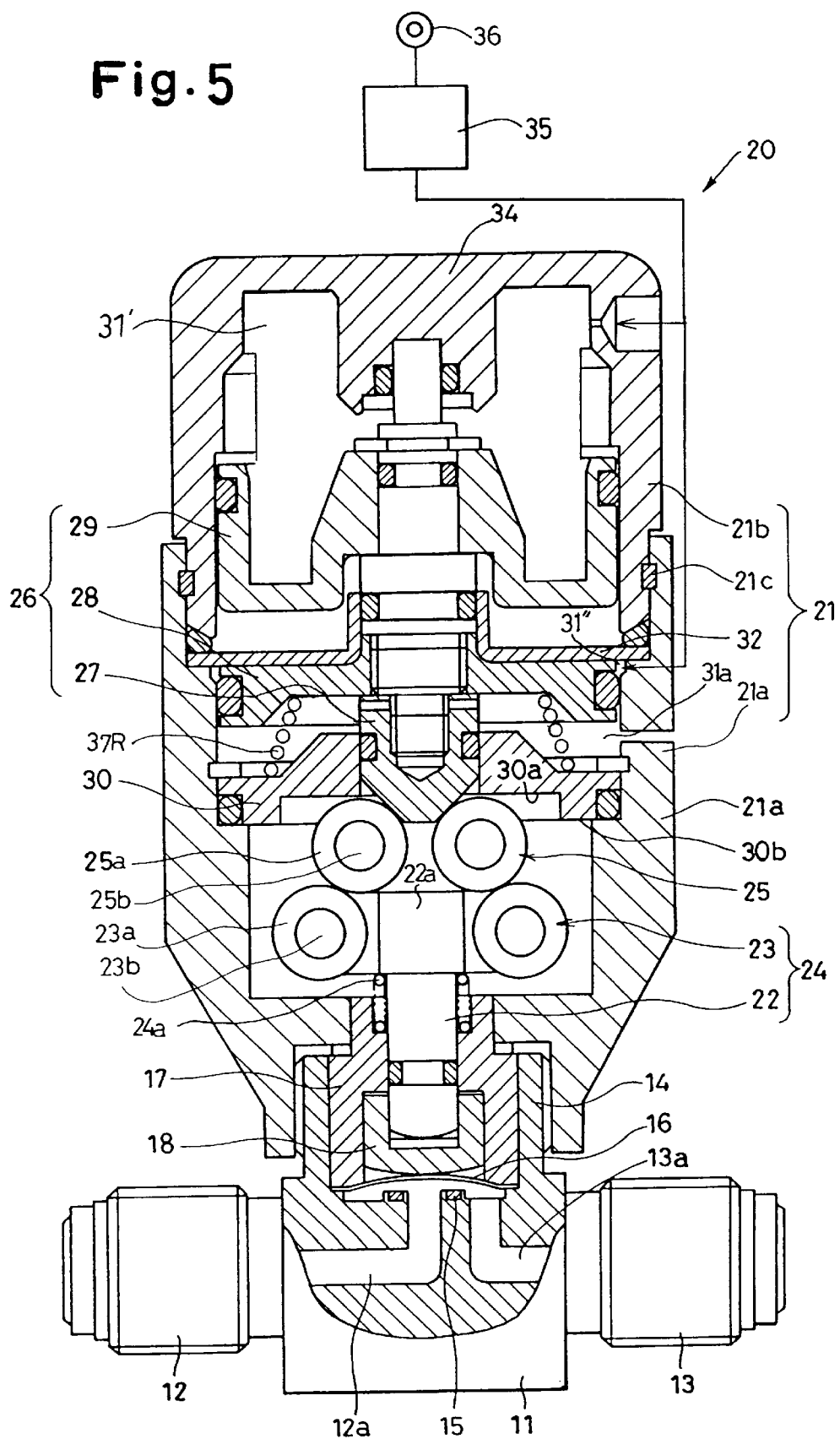

The above-mentioned embodiment is applied to a normally closed type valve in which the valve closing force is produced by the compression spring. The present invention can be applied to a normally open type valve in which the valve closing force is produced by the pilot pressure, as shown in FIG. 5. In FIG. 5, there is no compression spring 37 shown in FIGS. 1 and 2, and the chamber 31' in which the compression spring 37 is housed in FIGS. 1 and 2 serves as a pilot pressure chamber. When the pilot pressure is introduced in the pilot pressure chambers 31' and 31", the operation member 26 is moved toward the valve stem 22 to close the valve. In the second embodiment shown in FIG. 5, the compression spring 37R is provided, for example, in the pilot pressure chamber 31a shown in FIGS. 1 and 2 to obtain the valve opening force.

Although the valve stem 22 and the valve body 18 are made of separate pieces in the illustrated embodiments, it is possible to make them a single piece. The presence or absence of an intermediate member such as the metal diaphragm 16 between the valve body 18 and the annular valve seat 15 is determined in accordance with the kind or properties of the fluid to be fed through the fluid passages 12a and 13a. Moreover, although the valve assembly 24 is provided with a pair of valve stem roller members 23 in the illustrated embodiments, it is possible to provide more than two valve stem roller members which are spaced in the circumferential direction preferably at an equiangular distance around the shaft 22.

Figure 6:
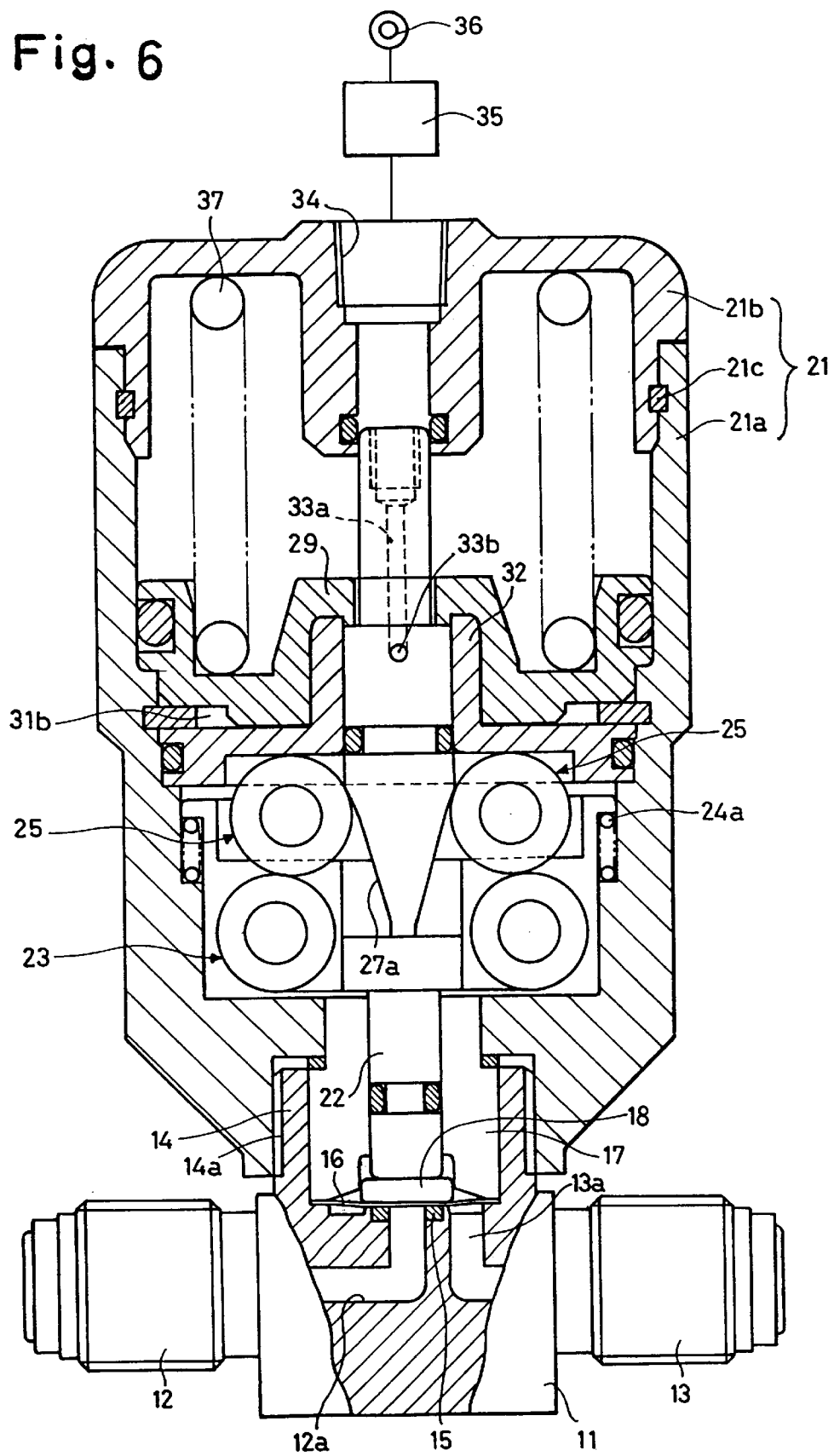
FIG. 6 is a longitudinal sectional view of a normally closed type toggle valve shown in a closed position, according to a further aspect of the present invention.
Figure 7:
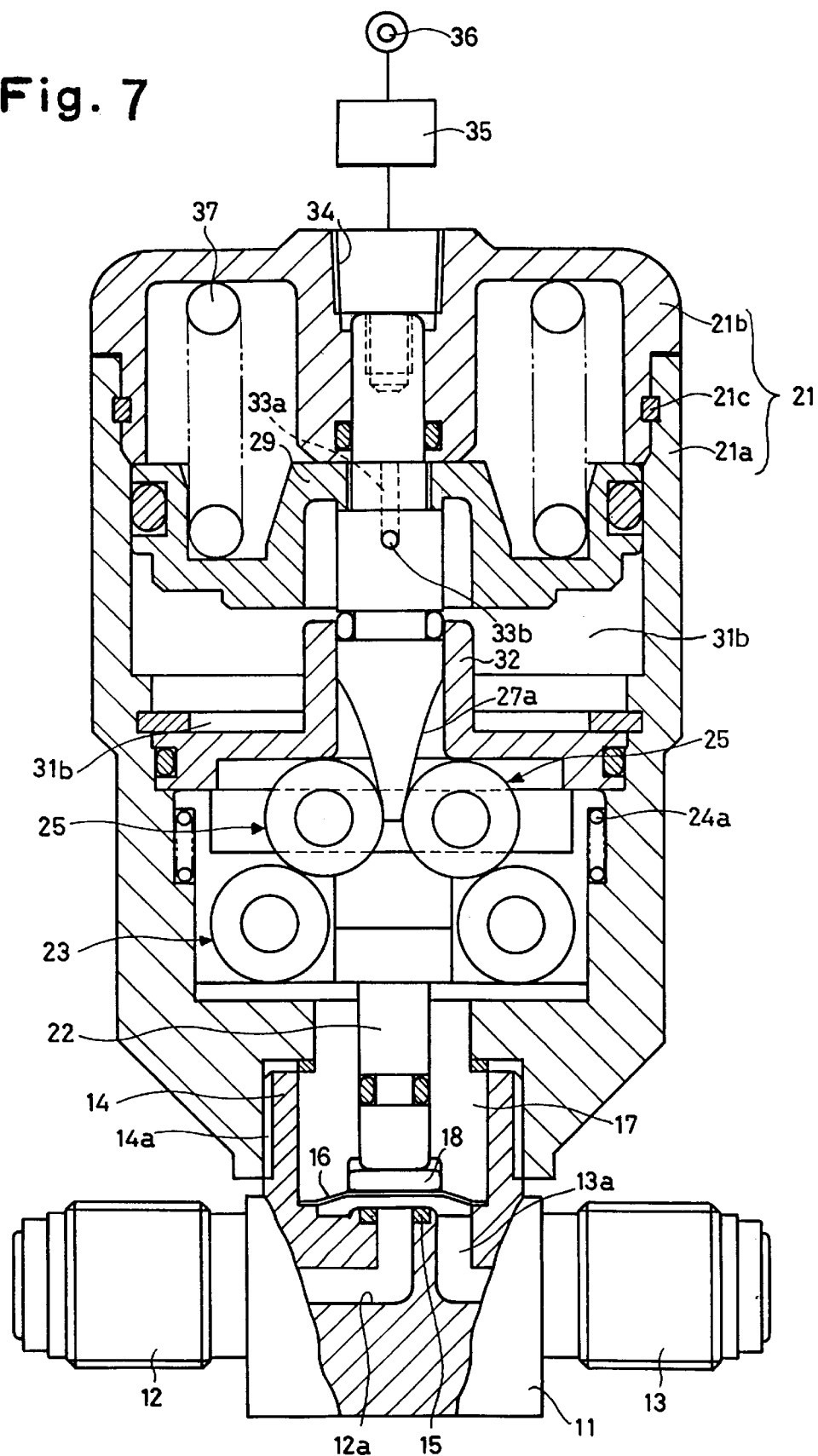
FIG. 7 is a longitudinal sectional view of a normally closed type toggle valve shown in an open position, according to a further aspect of the present invention.

FIGS. 6 and 7 show a further embodiment of the present invention. The further embodiment is different from the embodiment shown in FIGS. 1 through 4 by the following points. A single piston 29 is employed instead of a double-piston in the embodiment of FIGS. 1 and 2. Namely, the piston 28 in FIGS. 1 and 2 is deleted. The taper angle of the surface 27a of the operational shaft is smaller than that shown in FIGS. 1 through 4. In other words, the tapered surface 27a is arranged such that a larger displacement of the operational member 27 causes a proportionally smaller displacement of the valve stem roller member 23, hence a larger power is obtained to close the valve.

As can be understood from the above discussion, according to the present invention, the toggle mechanism is realized by the tapered surface portion of the operation member, the intermediate rollers, and the valve stem rollers. Commercially available needle bearings which are inexpensive and can be precisely machined can be used as the rollers. Thus, an inexpensive, reliable and durable toggle valve can be provided.

What is claimed is:

1. A toggle valve comprising;
   a valve stem which is slideably supported by a housing and which moves a valve body away from and toward a valve seat;
   an operation member separate from the valve stem, which is supported by the housing to slide in a direction parallel with the axis of the valve stem;
   a valve stem roller member which is supported by the valve stem and which has a shaft mounted in a fixed position with respect to the axis of the valve stem, the shaft of the valve stem roller member having an axis which extends in a direction perpendicular to the direction of the sliding movement of the valve stem without intersecting the axis of the valve stem;
   a tapered surface provided on the end of the operation member adjacent to the valve stem; and
   an intermediate roller member mounted between the tapered surface of the operation member and the valve stem roller member in rolling engagement with the valve stem roller member and the tapered surface and having a shaft extending parallel to the axis of the valve stem roller member;
   said tapered surface, the intermediate roller member, and the valve stem roller member are arranged such that when the operation member is moved by a unit displacement toward the valve stem in order to move the valve stem toward the valve seat through the tapered surface, the intermediate roller member, and the valve stem roller member, the valve stem is moved by a displacement smaller than said unit displacement of said operation member.

2. A toggle valve according to claim 1, wherein a plurality of said valve stem roller members and a plurality of said intermediate roller members are provided in a rotation symmetry with respect to the axis of said valve stem.

3. A toggle valve according to claim 2, wherein said valve stem and said valve stem roller members comprise a valve stem assembly.

4. A toggle valve according to claim 1, wherein said valve stem is coaxial to said operation member.

5. A toggle valve according to claim 1, wherein the force to move said operation member toward the valve stem is produced by a spring, and the force to move said operation member away from said valve stem is produced by fluid pressure.

6. A toggle valve according to claim 1, wherein the force to move said operation member close to said valve stem is produced by fluid pressure, and the force to move said operation member away from said valve stem is produced by a spring.

7. A toggle valve according to claim 1, wherein said tapered surface comprises a conical surface.

8. A toggle valve according to claim 1, wherein said tapered surface comprises a wedge-like surface.

* * * * *